(12) United States Patent
Creusen et al.

(10) Patent No.: US 9,267,671 B2
(45) Date of Patent: Feb. 23, 2016

(54) RELEASABLE OPTICAL ELEMENT

(71) Applicant: KONINKLIJKE PHILIPS N.V., Eindhoven (NL)

(72) Inventors: Petrus Martinus Creusen, Eindhoven (NL); Wouter Petrus Kaandorp, Eindhoven (NL)

(73) Assignee: Koninklijke Philips N.V., Eindhoven (NL)

( * ) Notice: Subject to any disclaimer, the term of this patent is extended or adjusted under 35 U.S.C. 154(b) by 12 days.

(21) Appl. No.: 14/377,270

(22) PCT Filed: Jan. 25, 2013

(86) PCT No.: PCT/IB2013/050661
§ 371 (c)(1),
(2) Date: Aug. 7, 2014

(87) PCT Pub. No.: WO2013/118016
PCT Pub. Date: Aug. 15, 2013

(65) Prior Publication Data
US 2015/0369456 A1 Dec. 24, 2015

Related U.S. Application Data

(60) Provisional application No. 61/596,761, filed on Feb. 9, 2012.

(51) Int. Cl.
*F21V 5/04* (2006.01)
*F21V 17/12* (2006.01)
*F21V 7/00* (2006.01)
*F21V 9/16* (2006.01)
*G02B 5/02* (2006.01)

(52) U.S. Cl.
CPC . *F21V 17/12* (2013.01); *F21V 5/04* (2013.01); *F21V 7/00* (2013.01); *F21V 9/16* (2013.01); *G02B 5/02* (2013.01)

(58) Field of Classification Search
CPC ............. F21V 17/12; F21V 5/04; F21V 7/00; F21V 9/16; G02B 5/02
See application file for complete search history.

(56) References Cited

U.S. PATENT DOCUMENTS

| 4,982,131 | A | | 1/1991 | Meyer | |
| 5,993,029 | A | * | 11/1999 | Chambers | F21V 3/00 362/363 |
| 2010/0309660 | A1 | | 12/2010 | Lim | |
| 2011/0205742 | A1 | * | 8/2011 | Lee | F21V 5/04 362/294 |

FOREIGN PATENT DOCUMENTS

CN 201218466 Y 4/2009

* cited by examiner

Primary Examiner — Mary Ellen Bowman

(57) ABSTRACT

An optical element (100) for releasable connection to a lighting module (103), the optical element comprising; an outer member (102) having a cylindrical portion, the cylindrical portion having a shoulder portion (104) extending towards a central axis of the cylindrical portion; an inner member (110) having a cylindrical portion at least partially arranged within the cylindrical portion of the outer member (102); wherein the optical element further comprises at least one deformable member (108) arranged within the cylindrical portion of the outer element adjacent to the shoulder; and at least one of the inner and the outer member comprising an optical member (120) for modifying light emitted from the lighting module; and wherein the inner member is movable in an axial direction in relation to the outer member to compress the deformable member between a base surface of the cylindrical portion of the inner member and the shoulder portion of the cylindrical portion of the outer member.

14 Claims, 3 Drawing Sheets

RELEASABLE OPTICAL ELEMENT

CROSS-REFERENCE TO PRIOR APPLICATIONS

This application is the U.S. National Phase application under 35 U.S.C. §371 of International Application No. PCT/IB2013/050661, filed on Jan. 25, 2013, which claims the benefit of U.S. Provisional Patent Application No. 61/596,761, filed on Feb. 9, 2012. These applications are hereby incorporated by reference herein.

FIELD OF THE INVENTION

The current invention relates to an optical element, and to a lighting arrangement comprising such an optical element.

BACKGROUND OF THE INVENTION

In many lighting applications it may be desirable to be able to modify and replace different parts of the luminaire in order to achieve various lighting effects. Different effects may for example be achieved by changing optical elements such as reflectors or diffusing lenses.

Such optical elements are typically screwed or clamped to the lamp holder. Mounting and removal of the optical elements may be done manually by placing the fingers around the optical element or it may require the use of a tool.

Furthermore, it may be desirable to arrange luminaires in a recess in the ceiling or wall in which they are mounted in order to provide a low visible profile of the luminaire itself. In applications where the luminaire is countersunk into the surrounding material or where the space surrounding the luminaire is otherwise restricted, it may be difficult or even impossible to manually replace parts of the luminaire using conventional techniques once the luminaire is installed as a certain minimum distance between the module to be replaced and the surrounding may be required.

SUMMARY OF THE INVENTION

In view of the abovementioned and other drawbacks of prior art, a general object of the present invention is to provide an improved optical element simplifying mounting and dismounting of the optical element on a lighting module.

According to a first a aspect of the invention, these and other objects are achieved by an optical element for releasable connection to a lighting module, the optical element comprising an outer member having a cylindrical portion, the cylindrical portion having a shoulder portion extending towards a central axis of the cylindrical portion, an inner member having a cylindrical portion at least partially arranged within the cylindrical portion of the outer member. The optical element further comprises at least one deformable member arranged within the cylindrical portion of the outer element adjacent to the shoulder and at least one of the inner and the outer member comprises an optical member for modifying light emitted from the lighting module. The inner member is movable in an axial direction in relation to the outer member to compress the deformable member between a base surface of the cylindrical portion of the inner member and the shoulder portion of the cylindrical portion of the outer member.

In the present context, the axial direction should be understood as the direction along the cylindrical axis of a cylindrical or circular object.

The shoulder portion may reach around the circumference of the cylindrical portion of the outer member or it may be segmented so as to cover portions of the cylindrical portion corresponding to the at least one deformable element.

The deformable member may advantageously be an elastically deformable member such that it returns to its original shape when it is no longer compressed.

The present invention is based on the realization that a deformable member may advantageously be used to provide a mounting mechanism allowing easy mounting of an optical element to a lighting module in a constricted space or in situations where a compact luminaire is desirable. In an optical element according to embodiments of the present invention, the outer member is translated in an axial direction in relation to the inner member, or vice versa, so that the deformable member is compressed between the inner member and the shoulder portion of the outer member and thereby is expanded in a direction perpendicular to the axial direction in order to make contact with the lighting module such that the optical element is releasably connected to the lighting module through the friction between the deformable member and the lighting module. The deformable member may furthermore be fixedly connected to the inner member.

An advantage of the present invention is that the optical element may easily be mounted to a lighting module without the use of tools and without the need for manual access to the lighting module during mounting. Furthermore, in some embodiments, the optical element may be mounted to lighting modules having a different configuration as no particular receiving portion is required on the lighting module. Additionally, the optical element may be suitable to be mounted on lighting modules having somewhat different diameters as the amount of deformation of the deformable member determines the inner diameter of the optical element. Furthermore, the deformable member may be replaceable to allow for further customization of the optical element, offering even greater flexibility in the range of lighting modules on which the optical member may be mounted by providing deformable members having varying inner diameters.

In one embodiment of the invention, the inner member may preferably be movable in an axial direction in relation to the outer member through a rotation of the inner member in relation to the outer member.

According to one embodiment of the invention, the cylindrical portion of the inner member facing the lighting module may comprise at least one structure configured to interact with at least one corresponding structure of the lighting module such that the inner member is inhibited from rotating when the outer member is rotated during mounting of the optical element on the lighting module. The interacting structures of the inner member and the lighting module may for example be a protrusion of the inner member interacting with a corresponding recess of the lighting module such that the inner member does not rotate in relation to the lighting module while the optical element is being mounted on the lighting module. As is apparent to the person skilled in the art, the opposite arrangement is equally possible in which a protrusion of the lighting module interacts with a recess of the inner member. Other interlocking configurations known to the person skilled in the art are also possible.

Moreover, the inner member may advantageously comprise screw threads configured to interact with corresponding screw threads in the outer member. The interacting threads are configured to provide a translation of the inner member in an axial direction in relation to the outer member through a rotation of the inner member in relation to the outer member, thus providing a straightforward manner for mounting the optical element on the lighting module.

According to one embodiment, the inner member may be connected to the outer member through a bayonet coupling.

In one embodiment of the invention, at least one of the outer surface of the inner member or the inner surface of the outer member may advantageously comprise flexible grooves configured to interact with the opposing surface when the inner member is arranged within the outer member such that the inner member remains in position in relation to the outer member through a frictional force acting between the flexible grooves and the opposing surface. It may be advantageous to be able to mount the optical element by simply pushing the optical element towards the lighting module. Such a solution may for example be achieved by providing flexible grooves, ridges or other protrusions on at least one of the opposing surfaces which may then interact with the opposing surface so that a frictional force maintains the relative position of the inner and outer members when the optical element is mounted on a lighting module. The opposing surface may also comprise similar flexible groves, or the opposing surface may comprise rigid structures or protrusions. However, the opposing surface may equally well be a flat surface.

In one embodiment of the invention, the optical element may comprise a lever pivotably connected to the outer member and to a connecting member which in turn is pivotably connected to the inner member, the lever being arranged so that a movement of the lever towards the central axis of the cylindrical portion of the outer member translates the inner member in the axial direction in relation to the outer member to compress the deformable member between a base surface of the cylindrical portion of the inner member and the shoulder portion of the cylindrical portion of the outer member. A lever mechanism may advantageously be used to connect the optical element to a lighting module. During the closing of the lever, the hinge between the lever and the connecting member may preferably pass an equilibrium point such that after the equilibrium point has been passed, the lever is forced towards the closed position, thus eliminating the need for a separate locking feature. One or more levers may be arranged so that they can be accessed from the outside of the optical element in order to avoid that any contact is made to sensitive parts of the inside of the optical element such as a reflector during installation.

In one embodiment of the invention, the deformable member may advantageously be a deformable ring arranged along the circumference of the cylindrical portion of the outer element. Furthermore, the deformable ring may be replaceable so that the same optical element may be used together with lighting modules having different diameters by providing a deformable ring having a suitable inner diameter. Moreover, the flexible member may advantageously be an elastomer ring.

In one embodiment of the invention, the optical member may advantageously comprise a reflector. The reflector may for example be a part of the outer element or it may be attached to the outer element. The reflector may be used to alter the shape of light emitted from the light emitting module and by allowing easy replacement of the reflector. A luminaire comprising the aforementioned optical element may readily be modified according to the desired light distribution.

In one embodiment of the invention, the optical member may comprise a diffusing element, a phosphor element and/or a lens. In a similar manner as for the reflector, different diffusing elements, phosphor elements and lenses may advantageously be used to controllably achieve desirable color and light distribution properties from a luminaire. Accordingly, easy modification of a luminaire improves flexibility as it is not necessary to change the entire luminaire in order to change the lighting properties.

According to another aspect of the invention a lighting arrangement is provided comprising a lighting module and an optical element according to any of the previous embodiments.

BRIEF DESCRIPTION OF THE DRAWINGS

This and other aspects of the present invention will now be described in more detail, with reference to the appended drawings showing embodiments of the invention, wherein.

DETAILED DESCRIPTION

In the present detailed description, various embodiments of an optical element will be described mainly with reference to an optical element for releasably mounting on a lighting module.

Figure 1:
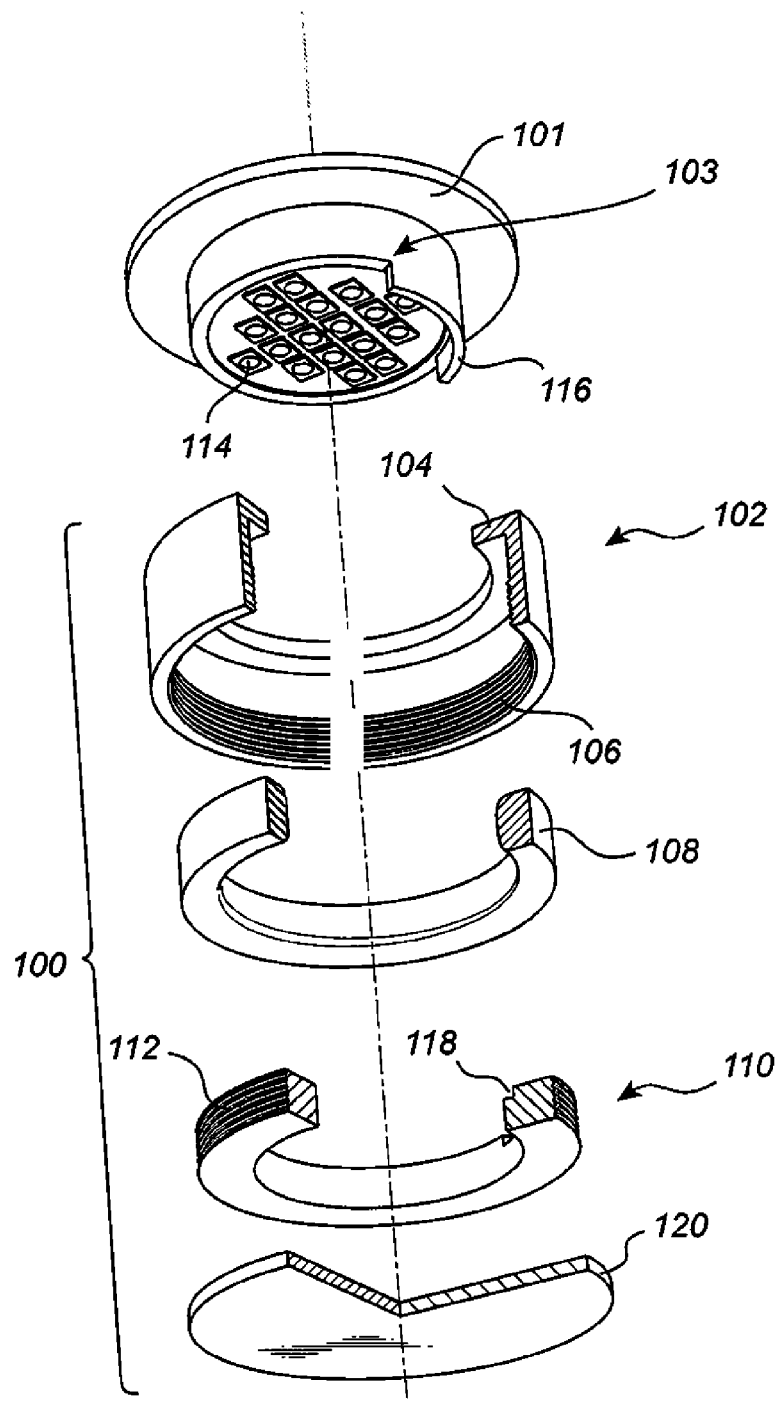
FIG. 1 schematically illustrates an exploded view of an optical element according to an embodiment of the invention.

In the exploded view in FIG. 1, an optical element 100 according to an embodiment of the invention is schematically illustrated. The optical element 100 comprises an outer member 102, an inner member 110, a deformable ring 108 and an optical member 120.

The outer member 102 in turn comprises a cylindrical portion which is provided with screw threads 106 on the inner surface of the cylindrical portion and a shoulder portion 104 extending towards a central axis of the cylindrical portion. The inner member is provided with corresponding screw threads 112 on its outer surface for engaging the screw threads 106 of the outer member 102. Moreover, the deformable ring is arranged between the base of the cylindrical portion of the inner member 110 and the shoulder portion 104 of the outer member 102.

Also illustrated in FIG. 1 is a lighting module 103 on which the optical element may be mounted. The lighting module 103 may for example be arranged in a lamp holder 101 as illustrated here. Typically, one or more light sources 114 such as LEDs are arranged on the lighting module.

As mounting of the optical element 100 includes rotating the outer member 102 in relation to the inner member 110, the lighting module 103 has a protruding structure 116 configured to interact with a recess 118 on the inner member 110 so that the inner member 110 is inhibited from rotating in relation to the outer member 102 when the optical element 100 is being mounted onto the lighting module 103.

The purpose of the optical member 120 is to modify light emitted from the lighting module 103, and the optical member 120 may for example be a color filter, a diffusing element, a lens, a reflector or any other light modulating structure known by the person skilled in the art. In the present embodiment, the optical member 120 is pre-attached to the outer member 102. However, the optical member 120 may be fixed to or releasably connected to the outer member 102 by any means known by the person skilled in the art which are suitable for the specific application at hand.

Figure 2A:
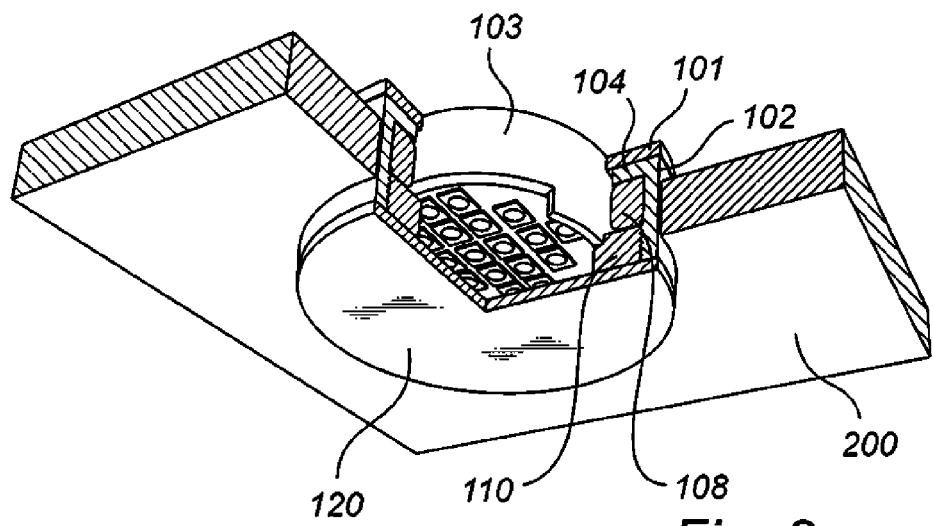
FIGS. 2a and 2b schematically illustrate an optical element according to an embodiment of the invention.

FIG. 2a schematically illustrates the optical element 100 and the lighting module 103 arranged in a structure 200 such as a ceiling or a wall. In some applications it may desirable to arrange the lighting module 103 in a recess in the structure 200 in order to reduce the visible profile of the luminaire formed by the lighting module 103 and the optical element 100 which is illustrated in FIG. 2a.

Figure 2B:
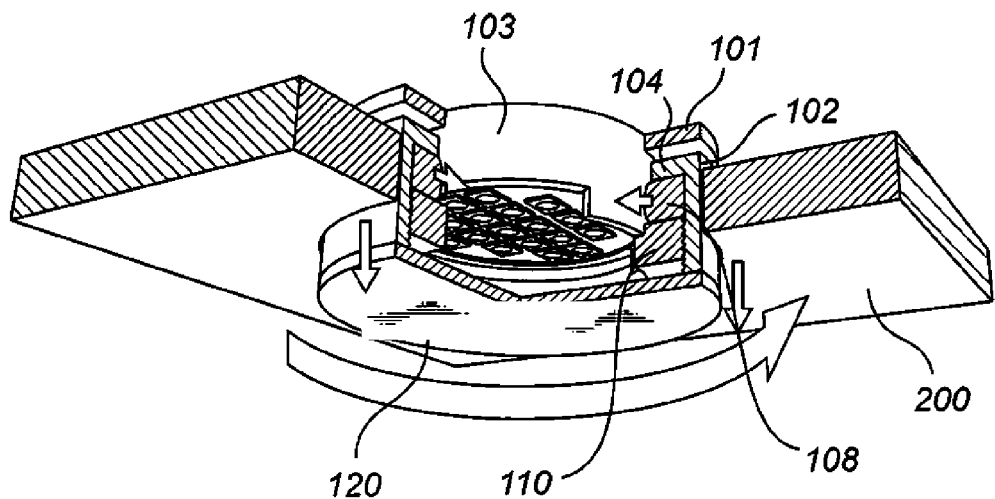

FIG. 2b illustrates how the optical element 100 is mounted onto the lighting module 103. As the optical element 100 is placed in contact with the lighting module 103, the protrusion 116 of the lighting module 103 engages the recession 118 in the inner member 110 so that the inner member 110 is inhibited from rotating in relation to the lighting module 103. Next, the outer module 102 is rotated in relation to the inner member 110 and in relation to the lighting module 103. The screw threads 106 and 112 are configured so that the rotation results in a translation of the outer member 102 in relation to the inner member 110. This translation provides for a compression of the deformable member 108 between the inner member 110 and the shoulder 104 of the outer member 102 such that the deformable member 108 expands in a direction towards the cylindrical axis and comes into contact with the lighting module 103. Accordingly, the optical element 100 is being kept in place on the lighting module 103 through the frictional force acting between the deformable member 108 and the lighting module 103. The deformable member 108 may for example be a rubber ring.

Figure 3A:
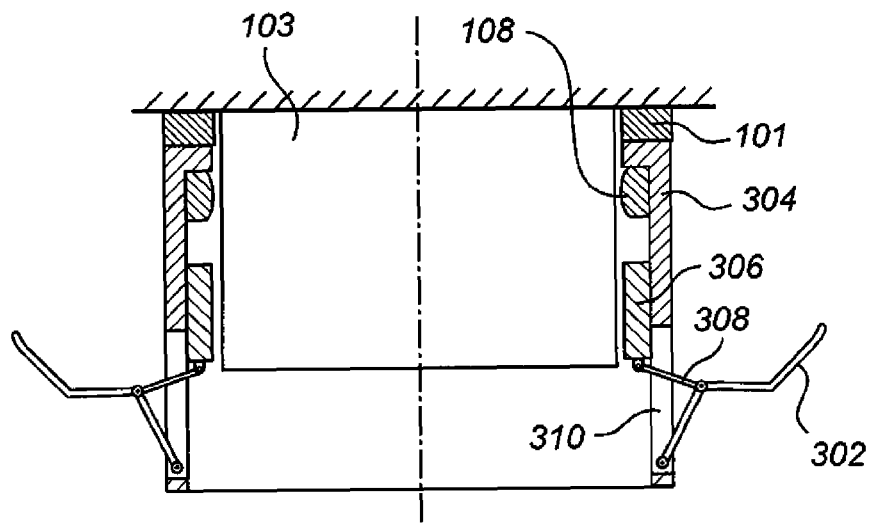
FIGS. 3a and 3b are schematic illustrations of an alternative embodiment of an optical element according to the present invention.
Figure 3B:
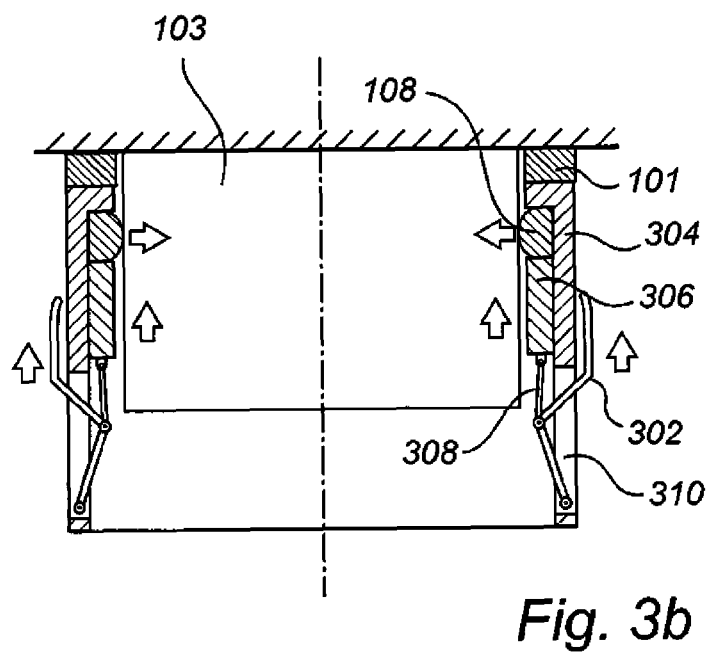

FIGS. 3a and 3b are schematic illustrations showing a cross sectional view of an embodiment of the present invention wherein the optical element 100 comprises a lever 302 pivotably connected to the outer member 304 and to a connecting member 308 which in turn is pivotably connected to the inner member 306. The lever 302 is arranged so that a movement of the lever 302 towards the cylindrical axis translates the inner member 306 in an axial direction in relation to the outer member 304 in order to compress the deformable member 108 between a base surface of the cylindrical portion of the inner member 306 and the shoulder portion 104 of the cylindrical portion of the outer member 304. The outer member 304 accordingly comprises openings 310 allowing for a pivoting movement of the lever 302 and the connecting member 308.

In the case when the optical element is not mounted onto the lighting module, the lever 302 is in an open position as illustrated in FIG. 3a. As the lever 302 is moved in a direction towards the outer element 304, the inner element 306 is translated via the connecting member 308 so that the deformable member 108 is compressed between the inner element 306 and the shoulder 104 of the outer member 304 and the deformable member 108 is expanded in a direction towards the cylindrical axis so as to come into contact with the lighting module 103. Furthermore, during the closing of the lever 302, the hinge between the lever 302 and the connecting member 308 may preferably pass an equilibrium point such that after the equilibrium point has been passed, the lever 302 is forced towards the closed position, thus eliminating the need for a separate locking feature. FIG. 3b illustrates the case where the optical element 100 is mounted on the lighting module 103. All parts of the optical element illustrated in FIGS. 3a and 3b except the lever mechanism are to be understood as cylindrical corresponding to an optical element similar to the one shown in FIG. 1.

The person skilled in the art realizes that the present invention by no means is limited to the preferred embodiments described above. On the contrary, many modifications and variations are possible within the scope of the appended claims. For example, the inner and outer element may be connected through a bayonet coupling. Alternatively, the mounting may be performed through a "push in" mechanism where the inner and outer elements are interacting through flexible ridges so as to remain in a mounted position when the inner element has been depressed in relation to the outer member in order to compress the deformable member.

The invention claimed is:

1. An optical element for releasable connection to a lighting module, said optical element comprising;
   an outer member having a cylindrical portion, said cylindrical portion having a shoulder portion extending towards a central axis of said cylindrical portion;
   an inner member having a cylindrical portion at least partially arranged within said cylindrical portion of said outer member;
   wherein said optical element further comprises at least one deformable member arranged within said cylindrical portion of said outer element adjacent to said shoulder; and
   at least one of said inner and said outer member comprising an optical member for modifying light emitted from said lighting module;
   wherein said inner member is movable in an axial direction in relation to said outer member to compress said deformable member between a base surface of said cylindrical portion of said inner member and said shoulder portion of said cylindrical portion of said outer member; and
   to expand said deformable member in a direction perpendicular to the axial direction such that the outer member is releasably connected to the inner member through a friction between deformable member and the inner member.

2. The optical element according to claim 1, wherein said inner member is movable in the axial direction in relation to said outer member through a rotation of said inner member in relation to said outer member.

3. The optical element according to claim 2, wherein said cylindrical portion of said inner member facing said lighting module comprises at least one structure configured to interact with at least one corresponding structure of said lighting module such that said inner member is inhibited from rotating when said outer member is rotated during mounting of said optical element on said lighting module.

4. The optical element according to claim 2, wherein said inner member comprises screw threads configured to interact with corresponding screw threads in said outer member.

5. The optical element according to claim 2, wherein said inner member is connected to said outer member through a bayonet coupling.

6. The optical element according to claim 1, wherein at least one of said outer surface of said inner member and said inner surface of said outer member comprises flexible grooves configured to interact with the opposing surface when said inner member is arranged within said outer member such that said inner member remains in position in relation to said outer member through a frictional force acting between said flexible grooves and said opposing surface.

7. The optical element according to claim 1, further comprising a lever pivotably connected to said outer member and to a connecting member which in turn is pivotably connected to said inner member, said lever being arranged so that a movement of said lever towards the central axis of said cylindrical portion of said outer member translates said inner member in an axial direction in relation to said outer member to compress said deformable member between a base surface of said cylindrical portion of said inner member and said shoulder portion of said cylindrical portion of said outer member.

8. The optical element according to claim 1, wherein said deformable member is a deformable ring arranged along the circumference of said cylindrical portion of said outer element.

9. The optical element according to claim 1, wherein said flexible member is an elastomer ring.

10. The optical element according to claim 1, wherein said outer member comprises a reflector.

11. The optical element according to claim 1, wherein said outer member comprises a diffusing element.

12. The optical element according to claim 1, wherein said outer member comprises a phosphor element.

13. The optical element according to claim 1, wherein said outer member comprises a lens.

14. A lighting arrangement comprising a lighting module and an optical element according to claim 1.

* * * * *